United States Patent [19]

Nagai

[11] Patent Number: 5,404,152
[45] Date of Patent: Apr. 4, 1995

[54] MULTI-DIMENSION TRACK-RING

[75] Inventor: Takao Nagai, Itami, Japan

[73] Assignee: Mitsubishi Denki Kabushiki Kaisha, Tokyo, Japan

[21] Appl. No.: 183,915

[22] Filed: Jan. 21, 1994

Related U.S. Application Data

[63] Continuation of Ser. No. 919,644, Jul. 27, 1992, abandoned.

[30] Foreign Application Priority Data

Feb. 25, 1992 [JP] Japan ................................. 4-037591

[51] Int. Cl.6 ............................................. G09G 3/02
[52] U.S. Cl. ...................................... 345/157; 345/166
[58] Field of Search ............... 345/156, 157, 159, 161, 345/163, 164, 166, 167

[56] References Cited

U.S. PATENT DOCUMENTS

| | | | |
|---|---|---|---|
| 4,181,823 | 1/1980 | DeLamoreaux et al. | 455/347 |
| 4,706,006 | 11/1987 | Solomon | 250/221 |
| 4,764,763 | 8/1988 | Wickstead et al. | 340/709 |
| 4,886,458 | 12/1989 | Roman | 434/243 |
| 4,905,007 | 2/1990 | Rohm | 340/709 |
| 4,928,093 | 5/1990 | Rahman | 340/710 |
| 4,933,670 | 6/1990 | Wislocki | 340/706 |
| 5,049,863 | 8/1991 | Oka | 340/709 |
| 5,122,654 | 6/1992 | Koh et al. | 340/710 |
| 5,175,534 | 12/1992 | Thatcher | 340/706 |

FOREIGN PATENT DOCUMENTS

3045133  7/1982  Germany ...................... 345/167

Primary Examiner—Jeffery Brier
Assistant Examiner—A. Au
Attorney, Agent, or Firm—Oblon, Spivak, McClelland, Maier & Neustadt

[57] ABSTRACT

A pointing device is disclosed which does not need an operation space and with which data of three or more dimensions is easily inputted. A pointing device is formed by a switch button, a first dial, a second dial and a body. The first dial is disposed around the switch button and specifies X coordinate of a cursor position. The second dial is disposed around the first dial and specifies Y coordinate of a cursor position. The body houses the switch button and the first and the second dials. The first and the second dials are independently rotatable both clockwise and counter-clockwise.

15 Claims, 10 Drawing Sheets

MULTI-DIMENSION TRACK-RING

This application is a Continuation of application Ser. No. 07/919,644, filed on Jul. 27, 1992, now abandoned.

BACKGROUND OF THE INVENTION

1. Field of the Invention

The present invention relates to a pointing device.

2. Description of the Background Art

Figure 1:
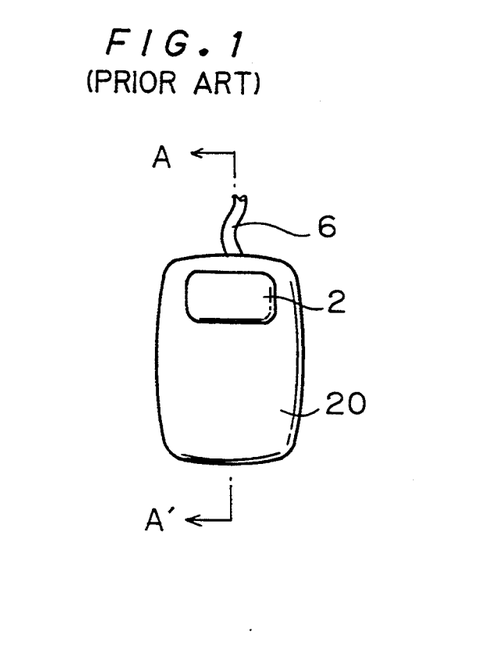
FIG. 1 is a plan view of a conventional pointing device, precisely, a mouse.
Figure 2:
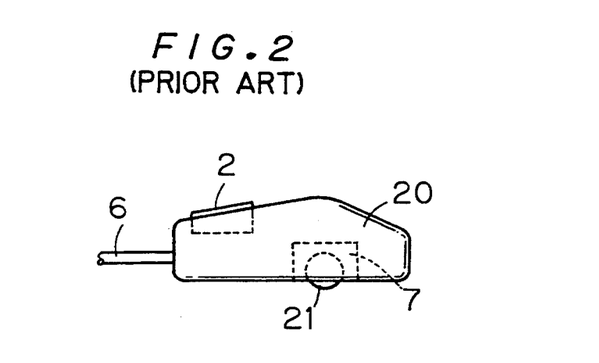
FIG. 2 is a cross sectional view taken of the conventional pointing device of FIG. 1 in lines A—A'.

FIG. 1 is a plan view showing the appearance of a mouse 20 (available from Apple Computer Inc.), a conventional pointing device, and FIG. 2 is a cross sectional view of FIG. 1 taken on lines A—A'. The mouse 20 is of an appropriate size so that it fits to a palm when held in a hand, and is connected with a terminal unit (not shown) by a cable 6 for signal transmission. As shown in FIG. 2, to measure a distance the mouse 20 has moved, a mechanism 7 is attached to a bottom portion of the mouse 20. A ball 21 is mounted to the mechanism 7. Finding rotations of the ball 21, the mechanism mechanically detects the distance the mouse 20 has run. Alternately, the mouse 20 comprises an optical sensor which optically detects the distance the mouse 20 has moved on a checker-patterned pad.

A button 2 is attached to the mouse 20 in a position where it can be easily reached by fingers of a gripping hand. Mouses of this type with two or three buttons are also already available in the market.

Operation of the mouse 20 will now be explained. An operator puts the mouse 20 on a flat surface, for example on a desk, and holds the mouse 20 with a hand. By moving an arm, the operator moves the mouse 20 widthways and lengthways. The distance the mouse 20 has moved determines X coordinate and Y coordinate to be inputted to the terminal unit, according to which a cursor moves on a display screen connected with the terminal unit. Having confirmed a cursor position moved on the display, the operator clicks the button 2 to determine the X and the Y coordinates so that software running on the terminal unit or a host computer executes a command specified by the determined X, Y coordinates. A resulting operation differs depending on software.

With the structure as above, the mouse 20, a conventional pointing device, demands not only a space on a desk large enough to be moved around but also requires repeated movements of an arm to input a large displacement. Further, nothing but two dimensional data can be inputted since the mouse 20 is operated only on a plane.

SUMMARY OF THE INVENTION

The present invention is directed to a pointing device for giving data about a cursor position on a display screen. In an aspect of the present invention, a pointing device comprises: a box-like body having a surface; a plurality of concentric rotation dials disposed in said surface of said box-like body, said concentric rotation dials being independently rotatable both clockwise and counter-clockwise; detection means for detecting a quantity and a direction of rotation of each one of said concentric rotation dials; and signal generation means for generating a position signal representing said cursor position, in accordance with said quantity and said direction of the rotation detected by said detection means.

The surface is preferably a top surface of said box-like body.

The pointing device may further comprise a switch for providing a decision signal by which said cursor position is fixed on a display screen.

The switch is preferably disposed in the vicinity of the center of said concentric rotation dials.

The detection means may include an optical sensor for optically detecting said quantity and said direction of the rotations.

The detection means preferably further includes a dial encoder connected to said optical sensor.

Each concentric rotation dial may have a striped surface so that stripes in said striped surface are detected by said optical sensor.

In an other aspect, the detection means includes a mechanical sensor for mechanically detecting said quantity and said direction of the rotations.

Among the concentric rotation dials may be: a first rotation dial, a rotation quantity and a rotation direction of which giving a direction from a current cursor position to a desired cursor position; and a second rotation dial, a rotation quantity and a rotation direction of which giving a distance from said current cursor position to said desired cursor position.

Preferably, the first rotation dial is provided on its operation surface with a mark for indicating said direction, said operation surface being a surface at which said first rotation dial is operated.

In an other aspect, the concentric rotation dials include: a first rotation dial, a rotation quantity and a rotation direction of which giving X coordinate of said desired cursor position; a second rotation dial, a rotation quantity and a rotation direction of which giving Y coordinate of said desired cursor position; and a third rotation dial, a rotation quantity and a rotation direction of which giving Z coordinate of said desired cursor position.

The concentric rotation dials preferaly have different heights above said surface of said box-like body.

In an aspect, above said surface of said box-like body, an outer one of said concentric rotation dials projects beyond an inner one of said concentric rotation dials.

Further, an inner-most one of said concentric rotation dials preferably projects beyond the switch.

In an aspect, each concentric rotation dial has an uneven operation surface in which low and high spots are formed.

The low and high spots may be different between said concentric rotation dials.

Further, the low spots may be engageable with a tip of a writing implement.

In a still other aspect, the pointing device further comprises a keyboard.

Thus, the rotations of the rotation dials, which give a cursor position, are disposed concentric in a surface of the box-like body. Since the rotation dials are rotated independently from each other and both clockwise and counter-clockwise, the pointing device does not need an operation space and enables efficient data input of multi-dimensional data.

A cursor is moved on a display screen without requiring an operation space. In addition, a person who has trouble in the arm can also use the pointing device of the present invention since the pointing device is operated only with fingers of an operator.

Accordingly, an object of the present invention is to obtain a pointing device which does not need an operation space and with which data of three or more dimensions is easily inputted.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
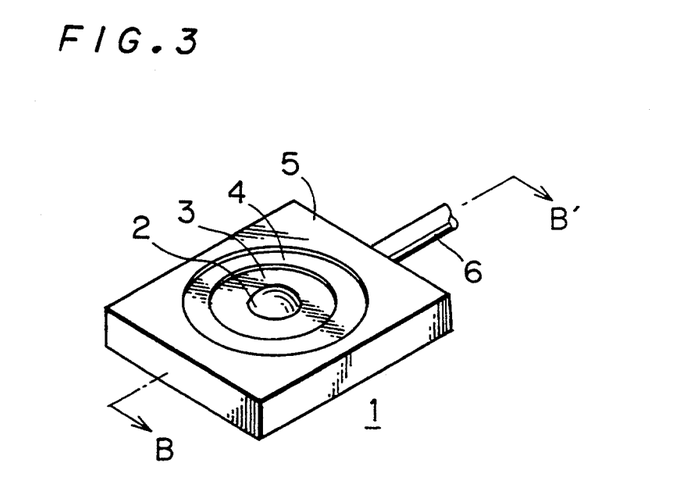
FIG. 3 is a perspective view of a pointing device according to a first preferred embodiment of the present invention.

FIG. 3 is a perspective view of a pointing device according to a first preferred embodiment of the present invention. The pointing device 1 is formed by a switch button 2, a first dial 3, a second dial 4 and a body 5. The switch button 2 specifies the coordinate of a position of a cursor. The first dial 3, disposed around the switch button 2, gives the X coordinate of the cursor position, while the second dial 4, disposed around the first dial 3, gives the Y coordinate of the cursor position. The switch button 2 and the dials 3 and 4 are held by the body 5.

Figure 4:
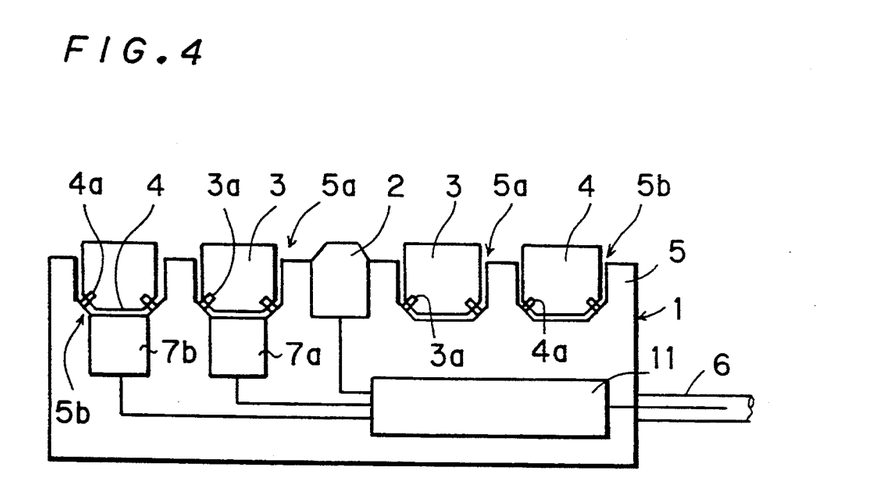
FIG. 4 is a cross sectional view of the pointing device of FIG. 3 taken in lines B—B'.
Figure 5:
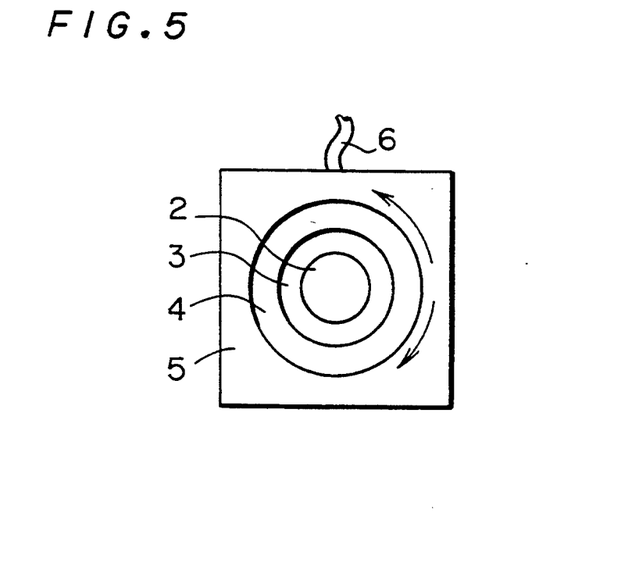
FIG. 5 is a plan view of the pointing device of FIG. 3.

FIG. 4 shows the pointing device 1 in cross section taken on lines B—B' of FIG. 3. The dials 3 and 4 are held in grooves 5a and 5b of the body 5 by ball bearings 3a and 4a, respectively. Hence, when moved with fingers of an operator put on top surfaces thereof, the dials 3 and 4 rotate clockwise or counter-clockwise in a circumferential direction (FIG. 5). Quantities and directions of rotations the dials 3 and 4 make are detected by rotation information detectors 7a and 7b, respectively.

Outputs from the rotation information detectors 7a and 7b are given to a signal generation mechanism 11, and routed to the terminal unit (not shown) via a cable 6. A signal from the switch button 2 is also fed in sequence to the signal generation mechanism 11 and, via the cable 6 to, the terminal unit.

Figure 6:
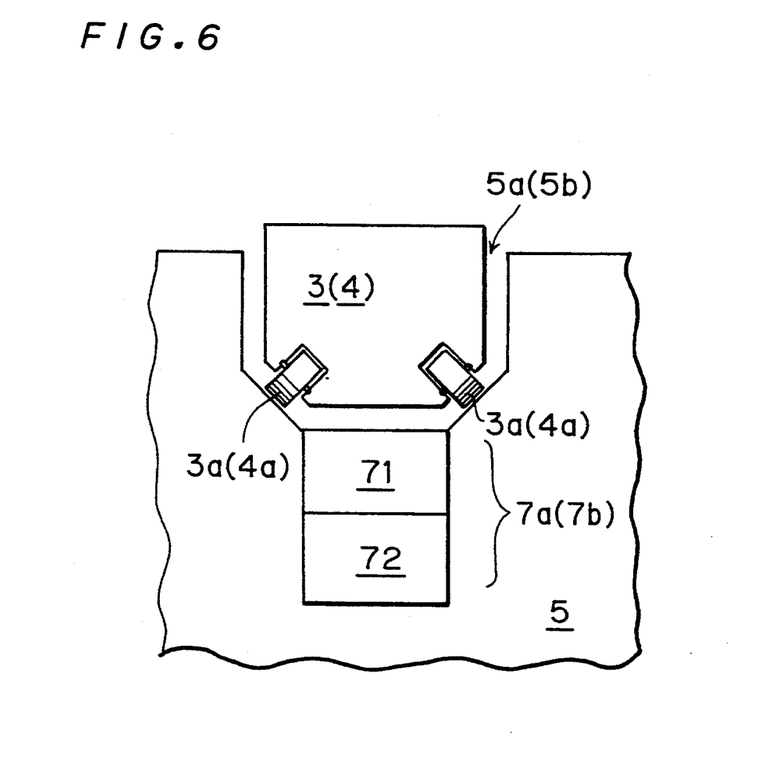
FIG. 6 is a cross sectional view taken in the vicinity of a first dial of the pointing device of FIG. 3.
Figure 7:
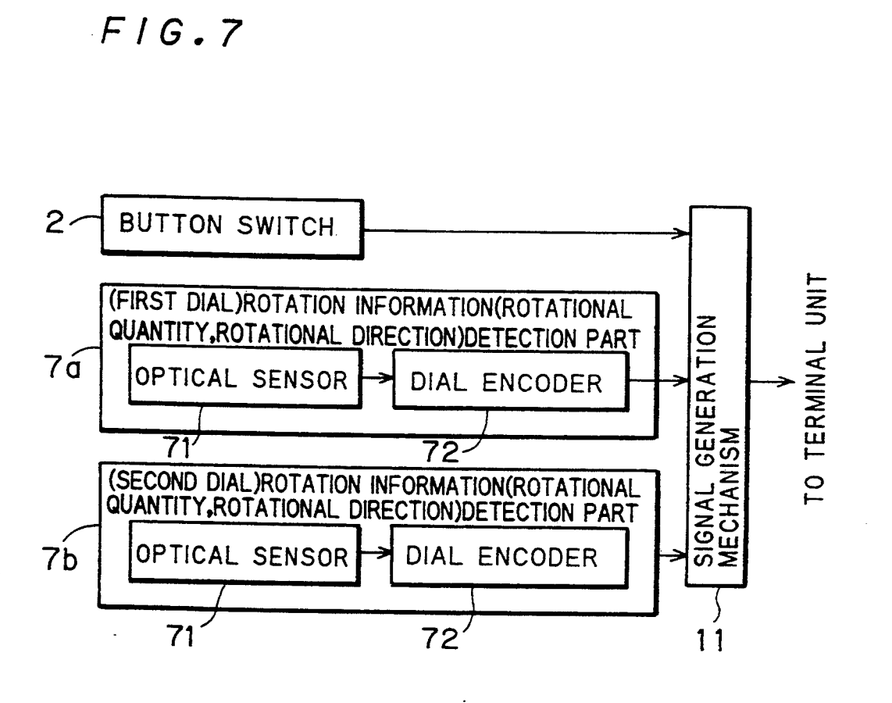
FIG. 7 is a block diagram for explaining the first preferred embodiment.

The rotation information detectors 7a and 7b may be any type of detector. FIG. 6 is an enlarged view of FIG. 4 taken in the vicinity of the first dial 3 (or the second dial 4) of a pointing device 1 which employs the rotation information detectors 7a and 7b of optical detection type. The rotation information detector 7a (7b) is mounted to the bottom of the groove 5a (5b), and formed by an optical sensor 71 facing the first dial 3 (4) and a dial encoder 72 connected to the optical sensor 71. The connections related to the rotation information detectors are diagrammatized in a block diagram of FIG. 7.

Figure 8:
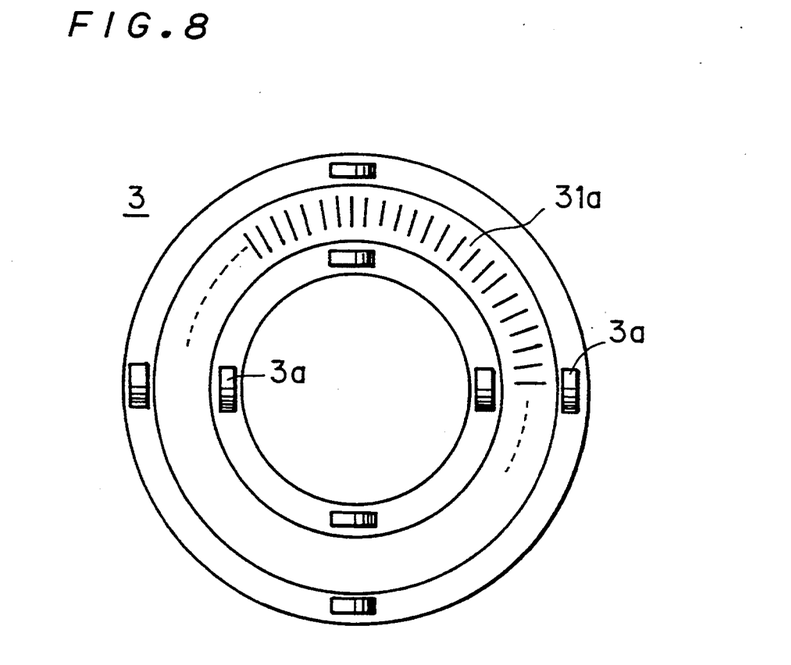
FIG. 8 is a plan view of the first dial.

The optical sensor 71 may be of conventional construction, in which case the first dial 3 is striped on a surface faced with the optical sensor 71, as shown in FIG. 8 where the dial 3 with stripes 31a, for example, viewed from the groove 5a is shown. The optical sensor 71 gives an electric signal corresponding to the stripes 31a to the dial encoder 72 where peak levels of the electric signal are counted. The dial encoder 72 then generates an electric signal which represents a rotational quantity and a rotational direction, and gives the same to the signal generation mechanism 11. For instance, the dial encoder 72 may be increase a count of X coordinate (Y coordinate) increases with clockwise rotations of the first dial 3 (second dial 4) and decrease a count of X coordinate (Y coordinate) with counter-clockwise rotations of the first dial (second dial 4).

Hence, the cursor is moved horizontally to the right side (left side) on a display screen by rotating the first dial 3 clockwise (counter-clockwise), while the cursor is moved upward (downward) by rotating the second dial 4 clockwise (counter-clockwise). The cursor is moved in a right upward direction (left downward direction) by rotating both the first and the second dials 3 and 4 clockwise (counter-clockwise).

Figure 9:
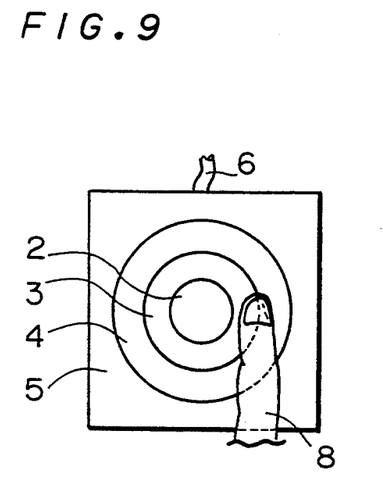
FIGS. 9 to 11 are explanatory diagrams showing an example of how the pointing device of FIG. 3 is operated.
Figure 10:
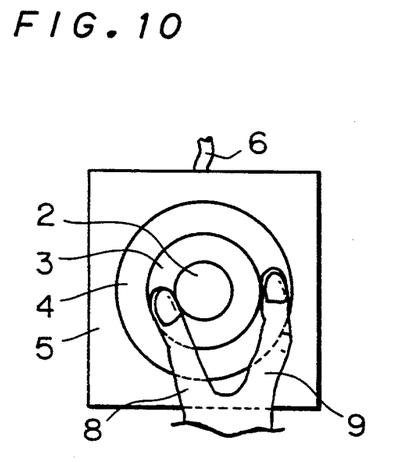
Figure 11:
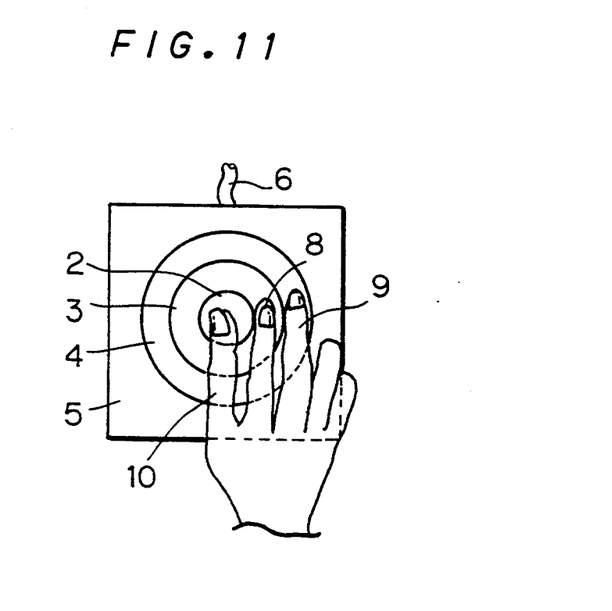

As shown in FIG. 9, by putting an index finger 8 across the first and the second dials 3 and 4 and rotating the both dials clockwise (counter-clockwise), for example, the cursor moves in a right upward direction (left downward direction) on the display screen. If a cursor movement in a right downward direction (left upward direction) is desired, the first dial 3 is rotated clockwise (counter-clockwise) while the second dial 4 is rotated counter-clockwise (clockwise). By placing the index finger 8 on a left portion of the first dial 3 and a middle finger 9 on a right portion of the second dial 4 and pulling forth the fingers 8 and 9 (FIG. 10), for example, the cursor moves in a left upward direction. The same result is also obtainable with the index finger 8 on a right portion of the first dial 3 and the middle finger 9 on a right portion of the second dial 4. For tracking, the button 2 is kept pressed with a thumb 10 while the dials 3 and 4 are rotated with the other fingers. Thus, operated only with fingers, the pointing device 1 does not need an operation space for moving around the pointing device 1. Of an equal importance, a person who has trouble in the arm can also use the pointing device 1 singe no arm movement is necessary.

Figure 12:
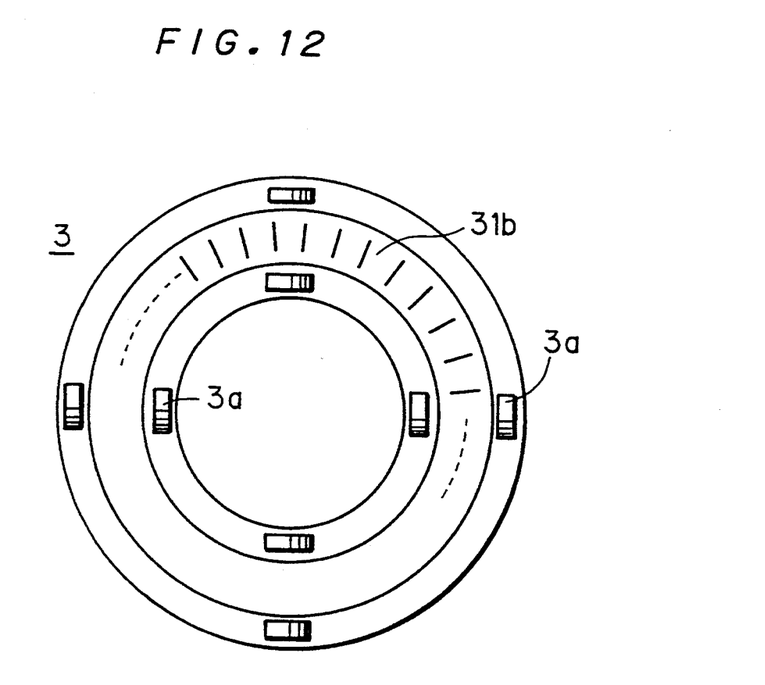
FIG. 12 is another plan view of the first dial.

A resolution of the optical detection of the rotation information including a quantity and a direction of rotations is changed by using a dial with stripes of intervals different from as heretofore disclosed. FIG. 12 is such an example where the first dial 3 has stripes 31b having wider stripe-to-stripe spacings than the stripes 31a.

Figure 13:
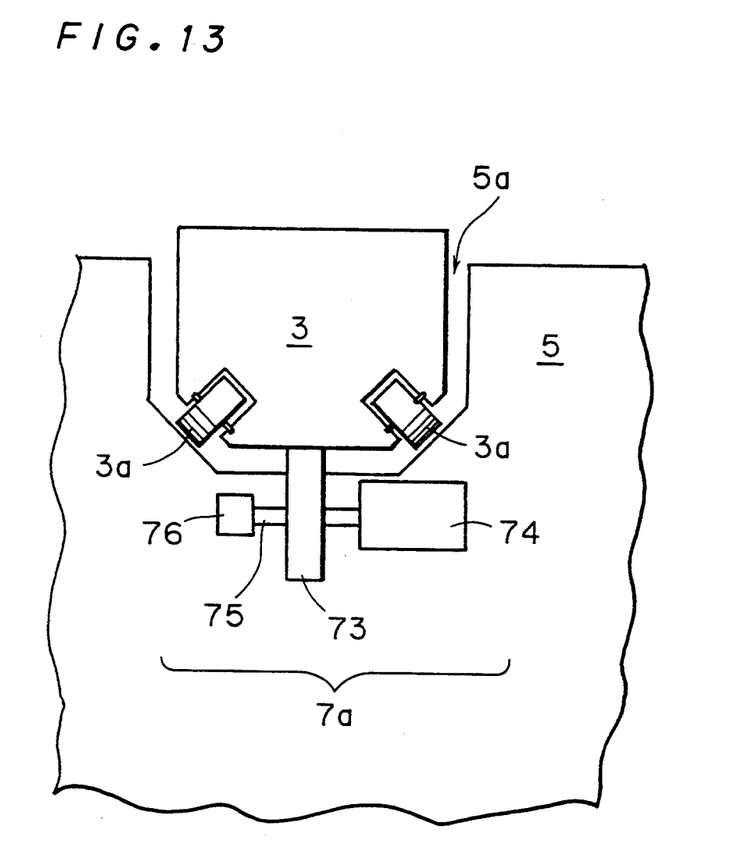
FIG. 13 is another cross sectional view taken in the vicinity of a first dial.

The rotation information may be detected mechanically. FIG. 13 is a view taken in the vicinity of the first dial 3 of a pointing device adopting a mechanical detection approach. A rotation drum 73 is disposed in contact with the first dial 3, and hence, rotates with rotations of the first dial 3. A shaft 75 is axially supported by a bearing 76. Rotations of the rotation drum 73, i.e., the rotations of the first dial 3 are transmitted by the shaft 75 to a rotary encoder 74 where their quantity and direction are converted into an electric signal.

Figure 14:
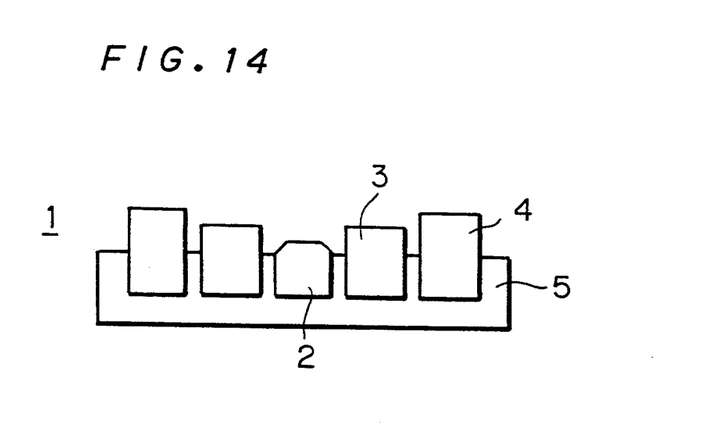
FIG. 14 is a schematic cross sectional view of a pointing device according to a second preferred embodiment of the present invention.

FIG. 14 is a schematic cross section of a pointing device according to a second preferred embodiment of the present invention. The first dial 3 projects beyond the button switch 2 above the body 5, and the second dial 4 projects beyond the first dial 3. This modification regarding the heights of the button switch 2 and the first and the second dials 3 and 4 above the body 5 allows the button 2 and the dials 3 and 4 to be operated with an improved independence.

Figure 15:
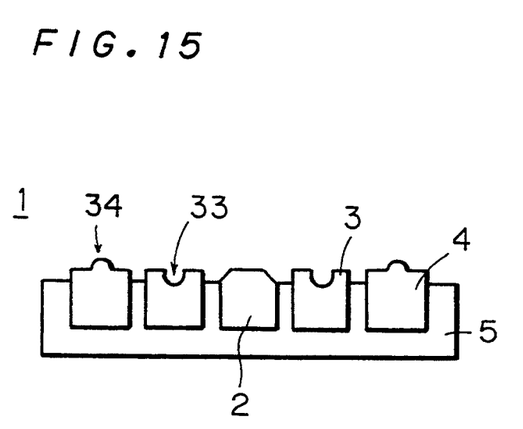
FIG. 15 is a schematic cross sectional view of a pointing device according to a third preferred embodiment of the present invention.

FIG. 15 is a schematic cross section of a pointing device according to a third preferred embodiment of the present invention. The first and the second dials 3 and 4 include low spots 33 and high spots 34, respectively, each on a surface where a finger of an operator is to be placed. If the low spots 33 are different in shape from the high spots 34, the first and the second dials 3 and 4 are distinguished from each other by a difference in touch felt at a fingertip. As a result of this feature an enhanced operability will be realized.

Figure 16:
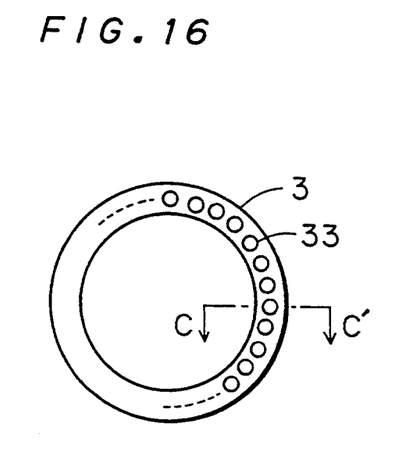
FIG. 16 is a plan view of a first dial according to a fourth preferred embodiment of the present invention.
Figure 17:
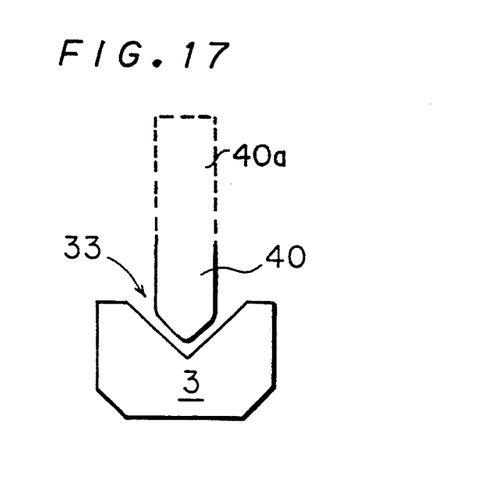
FIG. 17 is a cross sectional view of the first dial of FIG. 16 taken on lines C—C'.

FIGS. 16 and 17 are a top plan view and a cross section taken along lines C—C' of a pointing device according to a fourth preferred embodiment of the present invention, respectively. Each low spots 33 formed on a surface of the first dial 3 is as large and deep as a tip of a tool, especially, that of a writing implement, e.g., a tip 40 of a ball-point pen 40a. In the fourth preferred embodiment, therefore, the first dial 3 is rotated with a ball-point pen, hence allowing reduction in the size of the pointing device 1. For example, with the first and the second dials 3 and 4 each of 1 to 2 mm width, the pointing device 1 is applicable to smaller articles such as a portable computer and a wrist watch.

Figure 18:
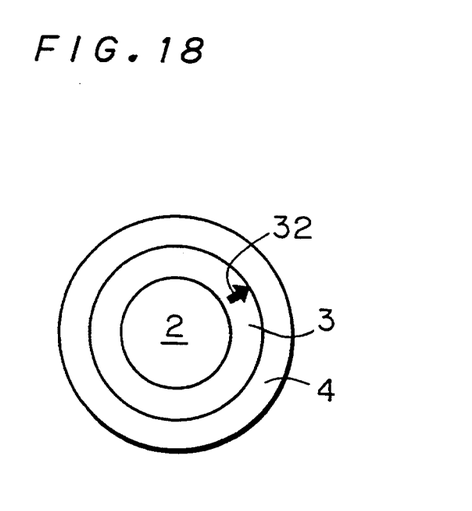
FIG. 18 is a schematic cross sectional view of a pointing device according to a fifth preferred embodiment of the present invention.

The first and the second dials 3 and 4 do not necessarily need to specify the exact coordinate of a desired cursor position. Instead, information about rotations of the first dial 3 may specify a direction from a current cursor position to a desired cursor position and information about rotations of the second dial 4 may specify a current-to-desired distance. FIG. 18 shows the first and the second dials 3 and 4 modified as such (fifth preferred embodiment). The first dial 3 of the fifth preferred embodiment is provided with an arrow mark 32 to indicate a direction from a current cursor position to a desired cursor position. An operator can specify a desired cursor position while referring to the arrow mark 32.

Figure 19:
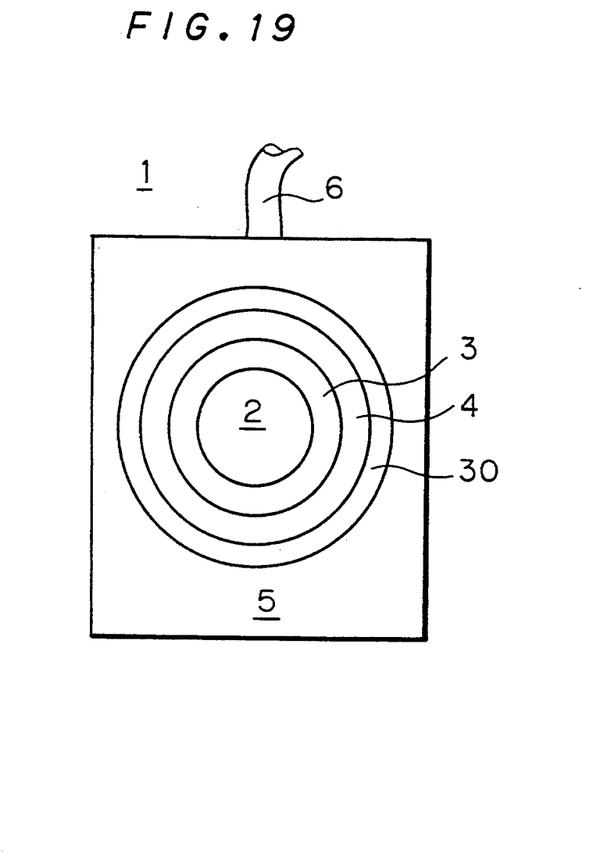
FIG. 19 is a schematic cross sectional view of a pointing device according to a sixth preferred embodiment of the present invention.

A person skilled in the art will easily understand that the present invention is not limited to the applications heretofore in which two dials are disposed. See FIG. 19 where a top plan view of a pointing device according to a sixth preferred embodiment of the present invention is shown. The pointing device 1 includes a third dial 30 disposed around the second dial 4. The first, the second and the third dials 3, 4 and 30 specify the X, the Y and the Z coordinates of a cursor position. Hence, input of three-dimensional data, often used in the field of computer graphics, is also among expected applications of the invention. The pointing device 1 may further include additional dials, needless to say.

Figure 20:
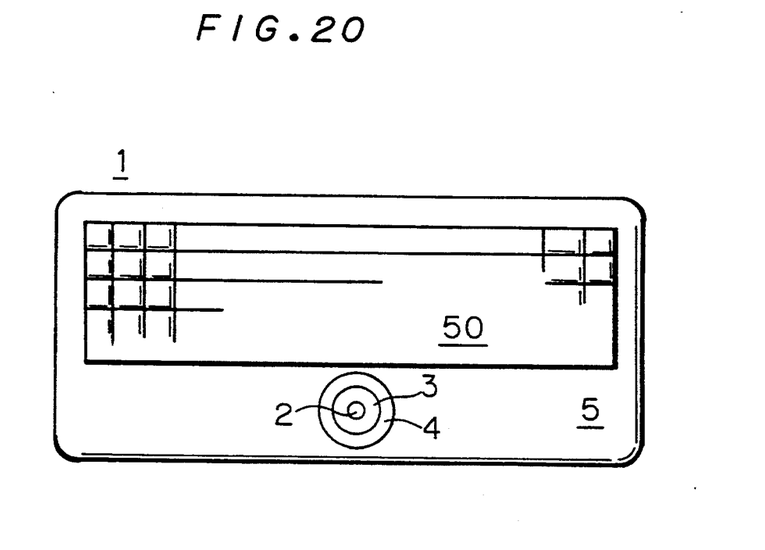
FIG. 20 is a schematic cross sectional view of a pointing device according to a seventh preferred embodiment of the present invention.

The pointing device 1 may alternatively include a keyboard 50 as shown in FIG. 20 (seventh preferred embodiment).

While the invention has been shown and described in detail, the foregoing description is in all aspects illustrative and not restrictive. It is understood that numerous modifications and variations can be devised without departing from the scope of the invention.

I claim:

1. A pointing device for giving data about a cursor position on a display screen, the pointing device comprising:
    a box-like body having a surface;
    a plurality of concentric rotation dials disposed in said surface of said box-like body, said concentric rotation dials being independently rotatable both clockwise and counter-clockwise;
    detection means for detecting a quantity and a direction of rotation of each one of said concentric rotation dials;
    signal generation means for generating a position signal representing said cursor position, in accordance with said quantity and said direction of the rotations detected by said detection means; and
    a switch for providing a decision signal by which said cursor position is fixed on the display screen;
    wherein:
    said surface of said box-like body is a top surface of said box-like body; and
    said switch is disposed in a center of said concentric rotation dials so as to be surrounded by said concentric rotation dials.

2. The pointing device of claim 1, wherein said detection means includes a mechanical sensor for mechanically detecting said quantity and said direction of the rotations.

3. The pointing device of claim 1, further comprising a keyboard.

4. The pointing device of claim 1, wherein said detection means includes an optical sensor for optically detecting said quantity and said direction of the rotations.

5. The pointing device of claim 4, wherein said detection means further includes a dial encoder connected to said optical sensor.

6. The pointing device of claim 5, wherein said concentric rotation dials each have a striped surface, stripes in said striped surface being detected by said optical sensor.

7. The pointing device of claim 4, wherein said concentric rotation dials include:
    a first rotation dial, such that a first rotation quantity and a first rotation direction of said first rotation dial gives a direction from a current cursor, position to a desired cursor position; and
    a second rotation dial, such that a second rotation quantity and a second rotation direction of said second rotation dial gives a distance from said current cursor position to said desired cursor position.

8. The pointing device of claim 7, wherein said first rotation dial includes an operation surface having a mark for indicating said direction, said operation surface being a surface at which said first rotation dial is operated.

9. The pointing device of claim 4, wherein said concentric rotation dials include:
- a first rotation dial, such that a first rotation quantity and a first rotation direction of said first rotation dial gives a X coordinate of said cursor position;
- a second rotation dial, such that a second rotation quantity and a second rotation direction of said second rotation dial gives a Y coordinate of said cursor position; and
- a third rotation dial, such that a third rotation quantity and a third rotation direction of said third rotation dial gives a Z coordinate of said cursor position.

10. The pointing device of claim 4, wherein said concentric rotation dials have different heights above said surface of said box-like body.

11. The pointing device of claim 10, wherein above said surface of said box-like body, an outer concentric rotation dial of said concentric rotation dials projects beyond an inner concentric rotation dial of said concentric rotation dials.

12. The pointing device of claim 11, wherein said switch projects beyond said surface of said box-like body, and said inner concentric rotation dial projects beyond said switch.

13. The pointing device of claim 4, wherein said concentric rotation dials each have an operation surface which define indented and protruded portions for forming low and high spots.

14. The pointing device of claim 13, wherein said low and said high spots are different between said concentric rotation dials.

15. The pointing device of claim 13, wherein said low spots are engageable with a tip of a writing implement.

* * * * *